United States Patent [19]

Moyer

[11] 4,275,897
[45] Jun. 30, 1981

[54] TRAILER EQUALIZER SPRING BAR HOLDER

[76] Inventor: James E. Moyer, 5727 Rio Verde Way, North Highlands, Calif. 95660

[21] Appl. No.: 29,123

[22] Filed: Apr. 11, 1979

[51] Int. Cl.$^3$ .............................................. B60D 1/14
[52] U.S. Cl. ............................. 280/406 A; 280/446 B
[58] Field of Search ............ 211/96; 248/289 R, 314, 248/315; 280/405 R, 406 A, 406 R, 446 B

[56] References Cited

U.S. PATENT DOCUMENTS

| | | | |
|---|---|---|---|
| 2,817,541 | 12/1957 | Mathisen | 280/406 A |
| 3,183,877 | 5/1965 | Benzel | 248/289 |
| 3,471,169 | 10/1969 | Palage et al. | 280/406 A |
| 3,552,771 | 1/1971 | Hendricks | 280/406 A |
| 3,675,785 | 7/1972 | Martin | 211/96 |
| 4,003,586 | 1/1977 | Luck | 280/446 B |

Primary Examiner—John J. Love
Assistant Examiner—Donn McGiehan
Attorney, Agent, or Firm—Blair, Brown & Kreten

[57] ABSTRACT

Disclosed herein is a holder for use with trailer equalizer spring bars which serve to distribute the forces that occur when the tongue weight is applied to a towing vehicle hitch, for example. The holder for use when the spring bars are not being deployed include an outwardly angulated cylinder fastened to a tongue of the trailer oriented to receive a downwardly extending segment of the spring bar at one extremity thereof, and at the extremity remote therefrom is a chain that is part of the equalizer spring bar. The chain therefore is used to lock the equalizing spring bars with an integral lock on the existing trailer tongue.

3 Claims, 8 Drawing Figures

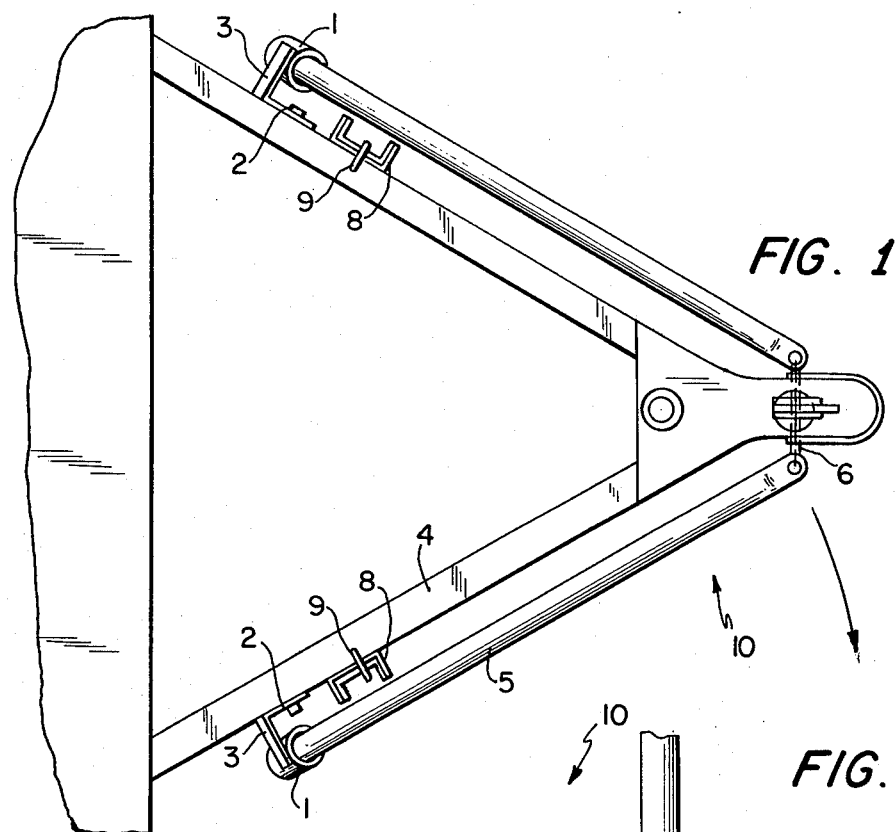
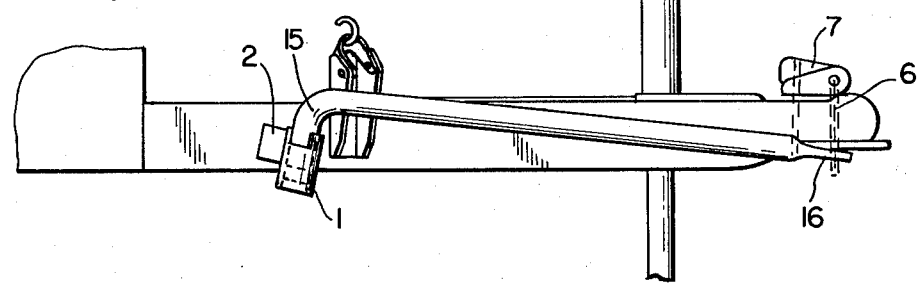
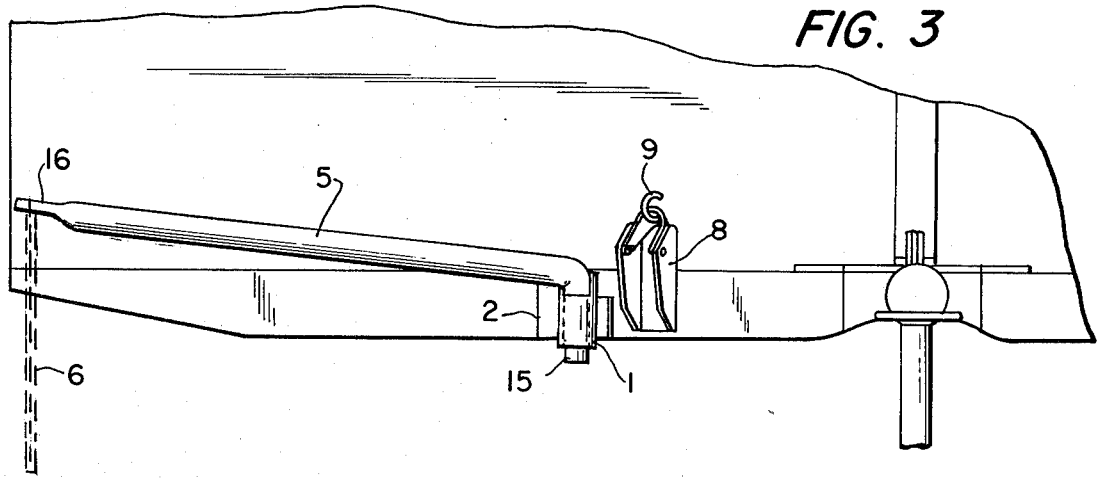

TRAILER EQUALIZER SPRING BAR HOLDER

BACKGROUND OF THE INVENTION

Spring bars for use with trailers have existed for quite some time, and it should be readily apparent that when not in use, these spring bars traditionally have provoked a vexing problem as far as storage is concerned. Characteristics to be considered when storing these bars include placing them in an environment proximate to the area of usage to minimize the amount of work and effort required to install same while at the same time not compromising the traditional storage spaces associated with vehicles that are towed and provide the towing. Further, it is desired to provide a convenient form for storing these bars which can be securely affixed to the towed vehicle so as to reduce the likelihood of an unauthorized removal.

The state of the art as seems to be relevant to the instant application include the following patents:

U.S. Pat. No. 3,471,169 Palage et al.; U.S. Pat. No. 3,552,771 Hendricks.

Neither of these references can be considered as providing a suitable storage area for these spring bars, but rather are relegated to providing teachings for the interconnection of the bars between the trailer and the towed vehicle for highway usage. It should be apparent therefore that inconveniences associated with not having a nesting area in close proximity to the area that requires the use of these spring bars tends to encourage their being left on the vehicle when in fact they should be removed. For example, damage can occur to a towing vehicle or skid bars on the rear of a trailer when backing up or proceeding up a sharp incline which would tend to lift the rear wheels of the towing vehicle off the ground.

SUMMARY OF THE INVENTION

It is therefore a purpose of this invention to provide holders for the spring bars to provide a storage area for them when not in use.

A further object contemplates providing holders and a storage area where the bars are safe from theft, from the ground elements, while not being stored in the towing vehicle.

The holders are so constructed so as to prevent them from being loosened from the storage area when backing up sharp inclines.

A further object contemplates providing a storage holder for spring bars which is economical to manufacture, can be easily retro-fitted to existing trailers, and is durable in construction.

These and other objects will be made manifest when considering the following detailed specification and drawings.

BRIEF DESCRIPTION OF THE DRAWINGS

FIG. 1 is a top plan view of the apparatus according to the present invention in a stored and locked position;

FIG. 2 is a side view of FIG. 1 in which an end of the L-shaped spring bar is shown rearwardly disposed nearest the trailer. It also shows the cut out section in the tube. This cut out is used to accomodate the spring bars in the temporary storage position;

FIG. 3 is a front view of the holding apparatus according to the present invention in which the spring bars are in a temporary storage position;

BRIEF DESCRIPTION OF THE PREFERRED EMBODIMENT

Figure 4:
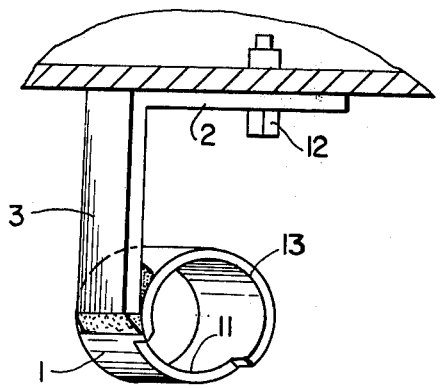
FIG. 4 is a top plan view of the holder according to the present invention.

Referring to the drawings now wherein like reference numerals refer to like parts throughout the several drawings, reference numeral 10 is directed to the storage device according to the present invention.

The storage device 10 can generally be regarded as being provided with two tubes 1 which are suitably connected to a trailer tongue 4 by means of a bracket 2,3 having one leg 2 juxtaposed to the tongue 4 and outwardly extending leg 3 which fastens to the tube 1. The leg 2 can be affixed to the tongue 4 by means of bolts 12, or by welding leg 2 to the snap up bracket 8 forming one piece.

Figure 5:
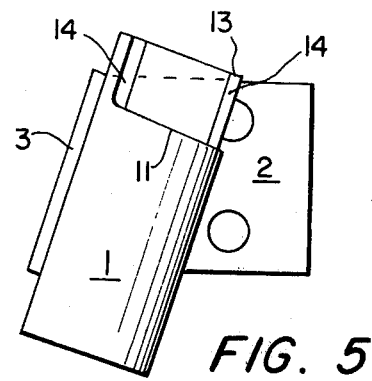
FIG. 5 is a side view (FIG. 4) of the hollow tube showing the 90° angle bracket with the mounting holes that are used to bolt the trailer spring bar holders to the trailer frame, and also the cut out area U-shaped in design that the spring bars rest in, while in the temporary storage position.

FIG. 5 shows the tube 1 and its associated L-shaped bracket 2,3 in which the tube 1 is canted relative to the vertical axis as is the outwardly extending leg 3. The outer face of the tube 1 has a cut away portion defined by a downwardly extending rim 14 and a horizontal cut away 11 which communicates with a second downwardly extending rim 14 so as to provide a U-shaped cut away relative to lip 13. As shown in FIG. 2, the spring bar 5 has a downwardly extending arcuate hook element 15 and a flat tapered eyelet 16 at opposed extremities and is so disposed such that the spring bar can not extend as far downwardly as it can in FIG. 3 due to the lip 13 coming in contact with the arcuate portion 15 of the spring bar. When rotated as shown in FIG. 3 however the bar 5 is allowed to be oriented with the cut away portion 11,14 so that the bar 5 extends downwardly and defines a temporary maneuvering position. This is extremely useful when negotiating steep terrain which requires the reorientation of these bars.

FIGS. 1 and 2 show a stored and locked position. The extremity of the spring bar 5 remote from the arcuate end 15 has a chain 6 passing through the eyelet 16 which loops through and over a top portion of the hitch lock 7 and through an eyelet thereof and is suitably fashioned so as to provide a means for locking same onto the trailer tongue.

Figure 6:
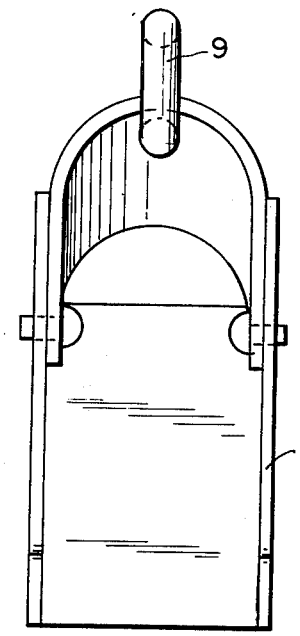
FIG. 6 shows a snap up bracket for use with the spring bars as shown in FIG. 8.
Figure 7:
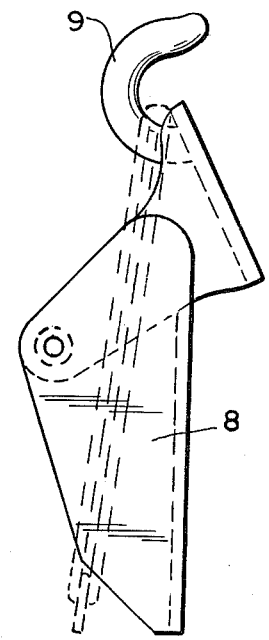
FIG. 7 is a side view of FIG. 6.
Figure 8:
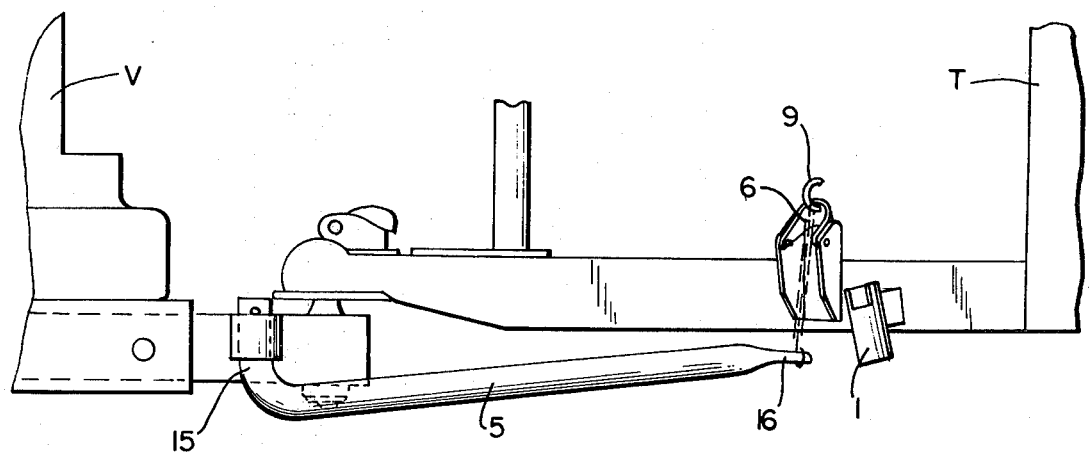
FIG. 8 shows the spring bars in the deployed condition.

FIG. 8 shows the spring bar in the deployed position in which the eyelet 16 and its chain 6 is fastened to a snap up bracket 8 having a hooked top portion 9 further shown in FIGS. 6 and 7. The arcuate end of the spring bar 5 extends into a cylindrical sleeve on the towing vehicle V.

Having thus described the invention, it should be apparent that numerous structural modifications are contemplated as being a part of this invention as explained hereinabove and as defined hereinbelow by the claims.

What is claimed is:

1. A storage device for spring bars used on trailers comprising in combination:

a tube connected to a trailer tongue oriented to receive a first end portion of the spring bar and a cutaway portion on an outer face of said tube away from the tongue so that the first end portion of the spring bar can be rotated and disposed within said cutaway portion whereby two positions for the spring bar are provided:

a first temporary position when the spring bar is within said cutaway portion to allow the trailer to traverse steep grades, and a second stowed and locked position for the spring bar when not in use wherein a second end portion of the spring bar is chained and locked to a hitch lock and the first end portion is within said tube and not in said cutaway portion.

2. The device of claim 1 wherein said tube is connected to the trailer tongue by an L-shaped bracket, whereby one leg of said bracket is fastened to the tongue and another leg is fastened to said tube.

3. The device of claim 2 wherein said tube is angulated relative to a vertical direction.

* * * * *